US007112892B2

(12) United States Patent
Mahowald

(10) Patent No.: US 7,112,892 B2
(45) Date of Patent: Sep. 26, 2006

(54) POWER SOURCE FOR SENSORS

(75) Inventor: Peter H. Mahowald, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 56 days.

(21) Appl. No.: 10/896,253

(22) Filed: Jul. 21, 2004

(65) Prior Publication Data

US 2006/0017291 A1 Jan. 26, 2006

(51) Int. Cl.
*F03B 13/00* (2006.01)
*H02P 9/04* (2006.01)

(52) U.S. Cl. ........................................... 290/54; 290/43

(58) Field of Classification Search .................. 290/43, 290/54; 60/608

See application file for complete search history.

(56) References Cited

U.S. PATENT DOCUMENTS 1,928,984 A * 10/1933 Scheerer ...................... 60/669
2,436,683 A * 2/1948 Wood, Jr ..................... 290/52
3,750,001 A * 7/1973 McCloskey .................. 322/35
4,731,545 A * 3/1988 Lerner et al. ................. 290/54
4,740,711 A * 4/1988 Sato et al. ..................... 290/52
4,746,808 A * 5/1988 Kaeser ......................... 290/52
4,779,006 A * 10/1988 Wortham ..................... 290/55
5,140,254 A * 8/1992 Katzman ..................... 322/35
6,011,334 A * 1/2000 Roland ......................... 310/86
6,051,892 A * 4/2000 Toal, Sr. ....................... 290/43
6,798,080 B1 * 9/2004 Baarman et al. .............. 290/43
6,848,503 B1 * 2/2005 Schultz et al. ............. 166/66.5
2003/0097482 A1 * 5/2003 DeHart et al. .............. 709/253
2005/0242591 A1 * 11/2005 Roskey ......................... 290/55
2005/0248161 A1 * 11/2005 Heidel ......................... 290/54

FOREIGN PATENT DOCUMENTS

JP 406074925 A * 3/1994

* cited by examiner

*Primary Examiner*—Julio Gonzalez

(57) ABSTRACT

A sensor is placed in wireless communication with a monitoring system. Power for the sensor is generated by scavenging power from fluid flow within a pipe.

15 Claims, 5 Drawing Sheets

POWER SOURCE FOR SENSORS

BACKGROUND

There is an increasing recognition of the usefulness of sensors to monitor the condition of property and the operation of appliances. Typically, power outlets or batteries are used to provide power for sensors. In some instances, where sunlight is available, solar power may be also utilized.

However, each of the above listed sources of power has limitations. For example, for some sensors, no direct pathway to sunlight is available. The wiring required to connect a sensor to a power outlet may be expensive to install. Batteries often discharge after a period of time and need to be replaced. This can present a difficulty when the sensor is not readily accessible. Even when the sensor is accessible, it is often difficult to detect when a battery is discharged. The necessary monitoring of the condition of the battery can be inconvenient and therefore neglected.

It is desirable, therefore, to explore other potential power sources for sensors.

SUMMARY OF THE INVENTION

In accordance with embodiments of the present invention, a sensor is placed in wireless communication with a monitoring system. Power for the sensor is generated by scavenging power from fluid flow within a pipe.

DESCRIPTION OF THE EMBODIMENT

Figure 1:
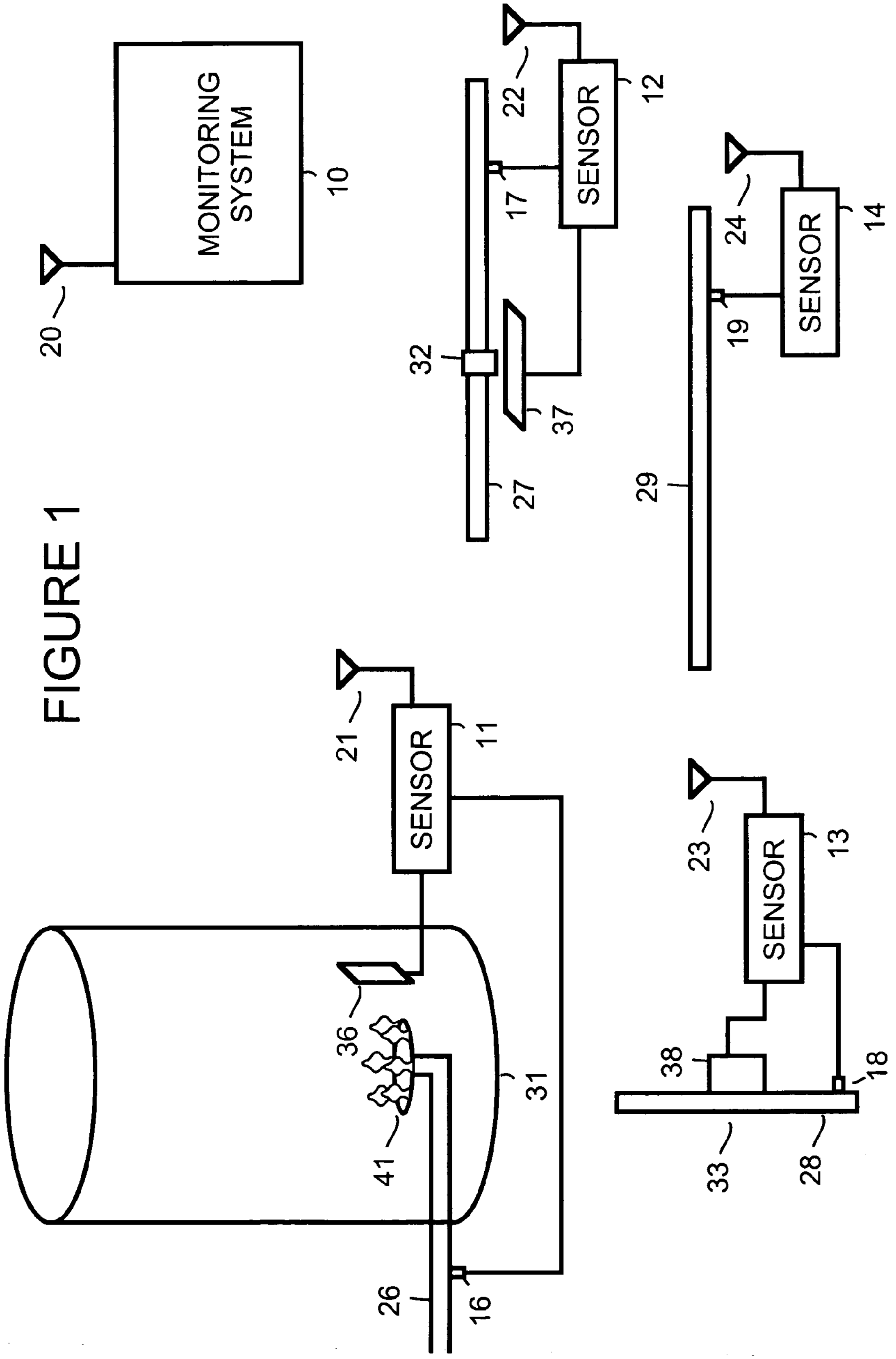
FIG. 1 is a simplified block diagram showing a monitoring system in communication with various sensors powered by scavenging power from fluid flow within pipes in accordance with an embodiment of the present invention.

FIG. 1 is a simplified block diagram showing a monitoring system 10 in wireless communication with a sensor 11, a sensor 12, a sensor 13 and a sensor 14. For example, sensor 11 transmits wireless transmissions, via an antenna 21, that are received by an antenna 20 of monitoring system 10. Sensor 12 transmits wireless transmissions, via an antenna 22, that are received by antenna 20 of monitoring system 10. Sensor 13 transmits wireless transmissions, via an antenna 23, that are received by antenna 20 of monitoring system 10. Sensor 14 transmits wireless transmissions, via an antenna 24, that are received by antenna 20 of monitoring system 10.

Sensor 11 uses an imager 36 to monitor a flame 41 within an appliance 31. For example, appliance 31 is a furnace, water heater, dryer or some other appliance that uses a gas to produce a flame. Sensor 11 scavenges power from fluid flow within a pipe 26 used to supply gas for flame 41. Power is scavenged through use of a generator 16.

Sensor 12 uses a moisture detector 37 to monitor integrity of a joint 32 within a pipe 27. For example, pipe 27 is a water pipe used in a home or business. Sensor 12 scavenges power from fluid flow within pipe 27. Power is scavenged through use of a generator 17.

Sensor 13 uses a thermometer 38 to monitor heat within a pipe 28. For example, pipe 28 carries water from a water heater. Sensor 13 scavenges power from fluid flow within pipe 28. Power is scavenged through use of a generator 18.

Sensor 14 monitors fluid flow within a pipe 29. For example, pipe 29 carries a liquid such as water or a gas such as natural gas. Sensor 13 scavenges power from fluid flow within pipe 29. Power is scavenged through use of a generator 19. The amount of power generated by generator 19 indicates fluid flow rate within pipe 29.

Figure 2:
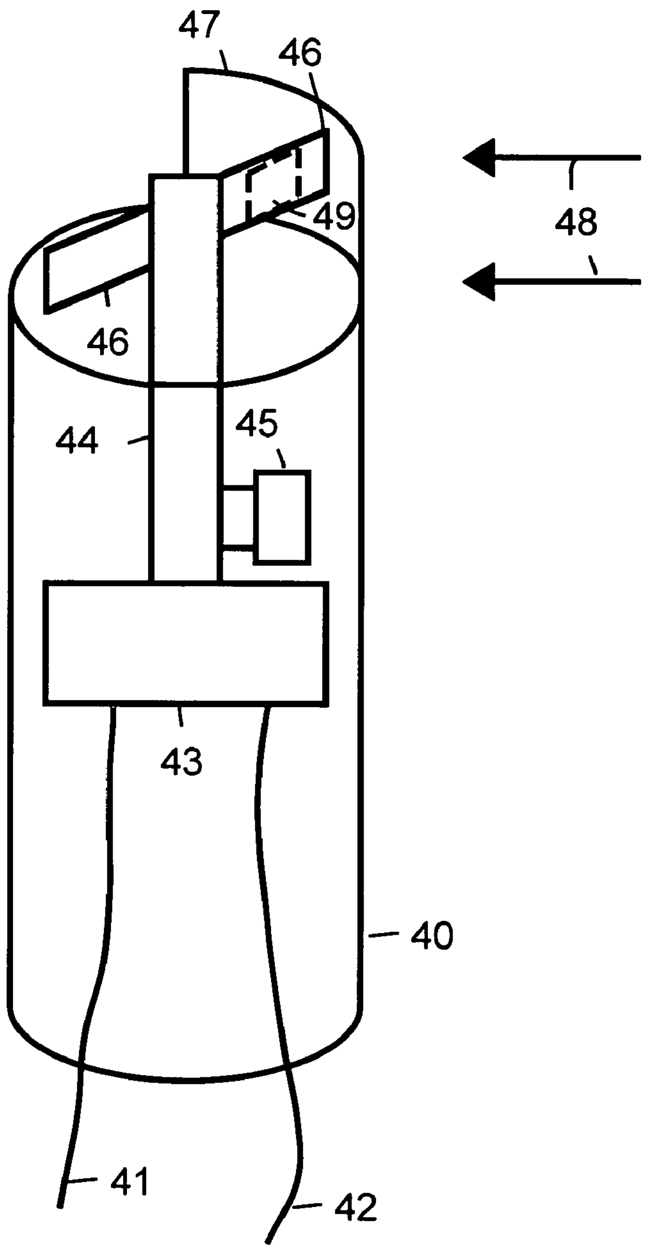
FIG. 2 is a simplified diagram showing a generator that scavenges power from fluid flow within a pipe in accordance with an embodiment of the present invention.

FIG. 2 is a simplified diagram showing implementation detail of a generator 40 used to scavenge power from fluid flow within a pipe in accordance with an embodiment of the present invention.

Paddlewheel 46 is rotated by fluid flow. Rotation occurs because when one leg of paddlewheel 46 is in fluid flow, the second wheel will be partly or fully shielded from fluid flow by a vane 47. A magnet 45 attached to a shaft 44 rotates with paddlewheel 46. Rotation of magnet 45 around shaft 44 produces an electrical current with a coil 43. The current within coil 43 generates an alternating current (AC) signal within a wire 41 and a wire 42.

The construction of generator 40 can vary within various embodiments of the present invention. For example, a magnet 49 (instead of or in addition to magnet 45) can be directly attached to one of the legs of paddlewheel 46. Provided paddlewheel 46 is close enough to coil 43, sufficient current generation will result. Alternatively, one of the legs of paddlewheel 46 can be magnetized. In other embodiments of the present invention, for example, a rectifier can be added so that a direct current (DC) signal is produced by generator 40.

Figure 3:
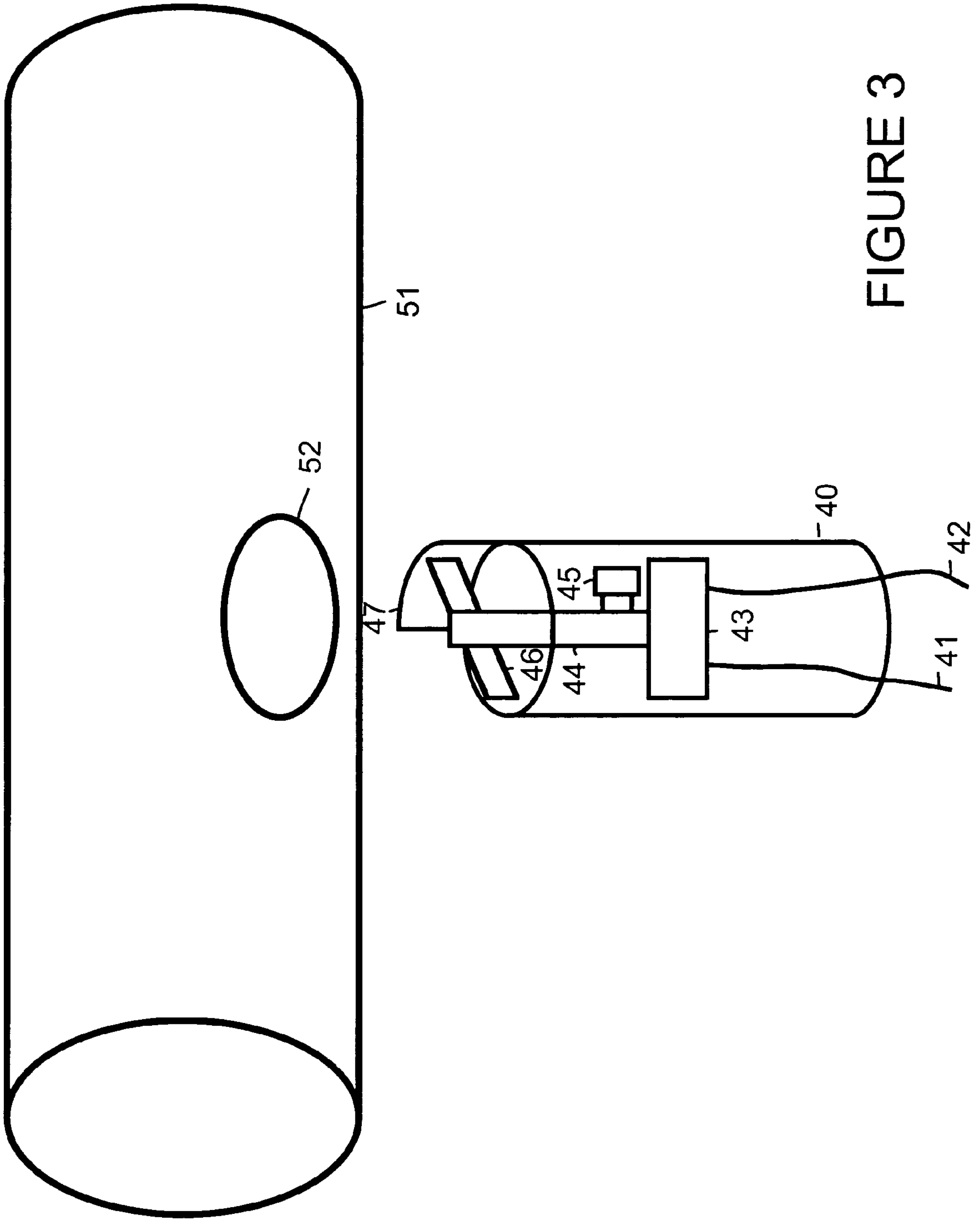
FIG. 3 is a simplified diagram showing a generator about to be attached to a pipe in accordance with an embodiment of the present invention.

FIG. 3 is a simplified diagram showing generator 40 about to be attached to a pipe 52. A hole 52 has been drilled in pipe 51. The diameter of hole 52 is sized to allow generator 40 to be fit snugly within hole 52. For example, both hole 52 and generator 40 are threaded to prevent leaks. This allows for insertion and sealing by rotation of generator 40 within hole 52. Alternatively, a leak preventing clamp is used to secure generator 40 to hole 52 and seal against leaks.

Figure 4:
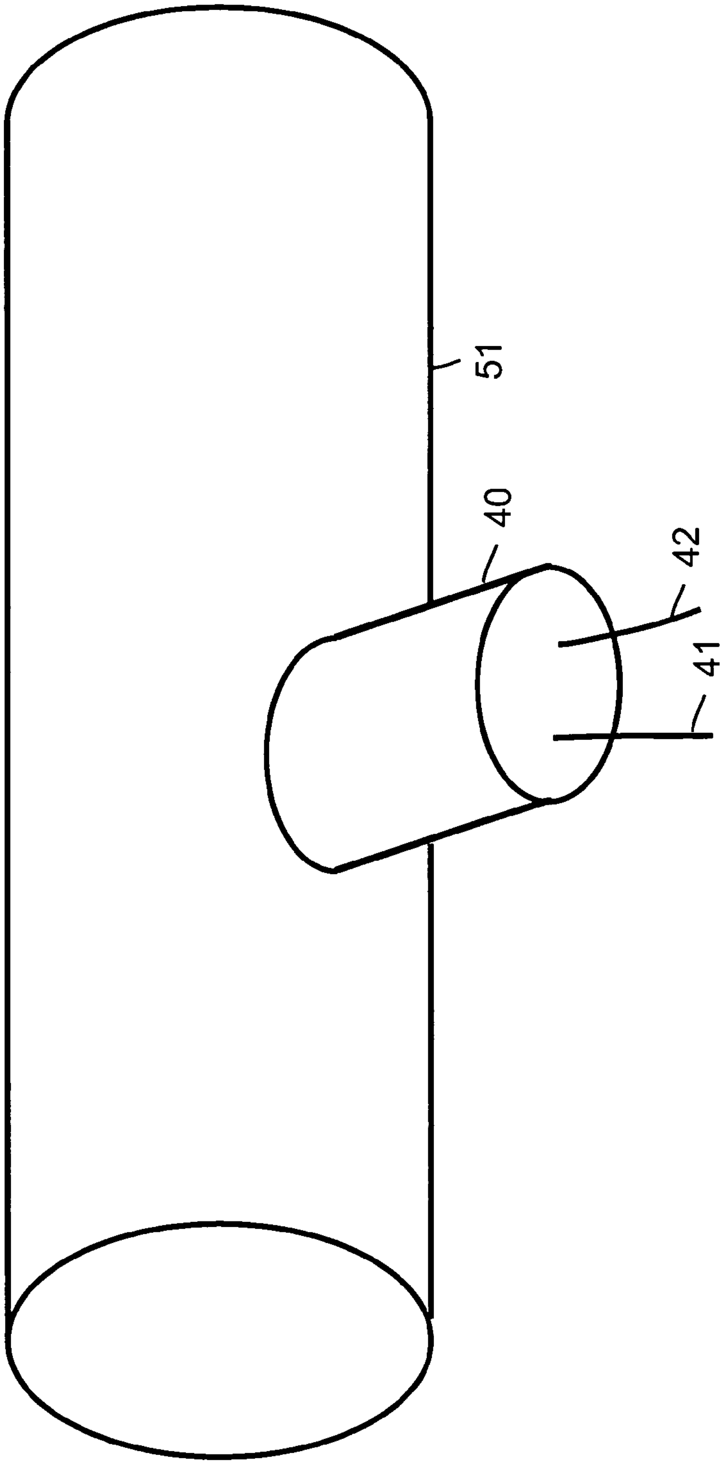
FIG. 4 is a simplified diagram showing a generator attached to a pipe in accordance with an embodiment of the present invention.

FIG. 4 shows generator 40 securely attached to pipe 51.

Figure 5:
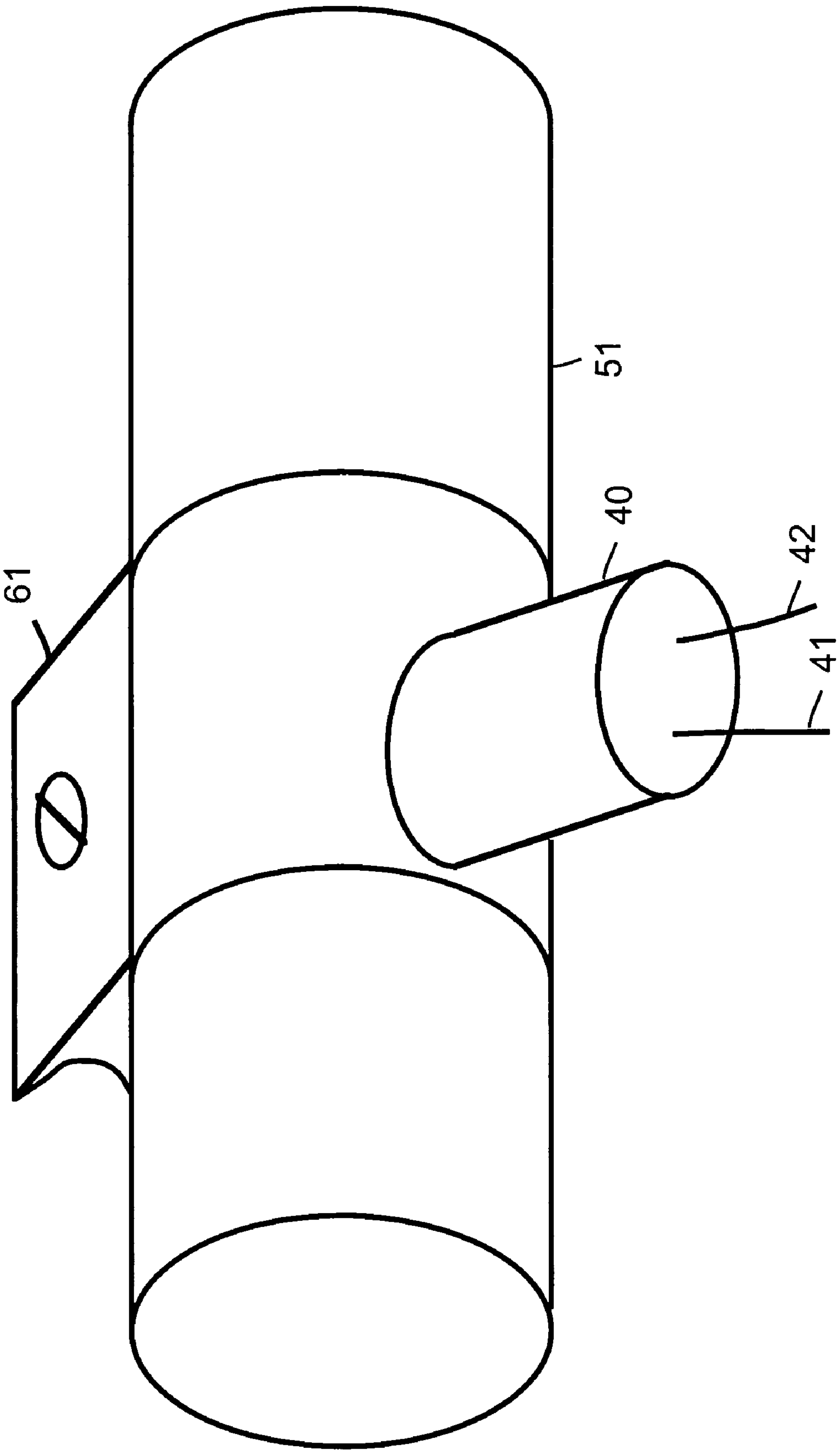
FIG. 5 is a simplified diagram showing a bracket that secures a generator to a pipe in accordance with an embodiment of the present invention.

FIG. 5 shows generator 40 securely attached to pipe 51. A clamp 61 has been added to assure the attachment of generator 40 to pipe 51 is sealed against leaks.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A system comprising:

a sensor in wireless communication with a monitoring system; and, a generator that generates power for the sensor, the generator partially placed through a hole within a pipe so that part of the generator is on one side of the hole and within the pipe and part of the generator is on another side of the hole and outside the pipe, the generator including:

a paddle wheel which is rotated by fluid flow within the pipe, a magnet that rotates with the paddle wheel, and a coil located in close proximity to the magnet so that rotation of the magnet generates an alternating current signal.

2. A system as in claim 1 wherein the magnet is attached to a shaft within the generator.

3. A system as in claim 1 wherein the magnet is located on a leg of the paddle wheel.

4. A system as in claim 1 wherein the magnet is implemented as a magnetized leg of the paddle wheel.

5. A system as in claim 1 wherein the sensor includes an imager that images a flame of an appliance.

6. A system as in claim 1 wherein the sensor includes a moisture detector.

7. A system as in claim 1 wherein the sensor includes a thermometer.

8. A system as in claim 1 wherein the sensor measures fluid flow within pipe.

9. A system as in claim 1 wherein the fluid is one of the following:

gas;

liquid.

10. A method for performing monitoring comprising:

placing a sensor in wireless communication with a monitoring system; and, generating power for the sensor by scavenging power from fluid flow within a pipe, including:

placing a generator partially through a hole within a pipe so that part of the generator is on one side of the hole and outside the pipe and part of the generator is on another side of the hole and within the pipe so that a paddle wheel of the generator is rotated by fluid flow within the pipe, rotating a magnet with the paddle wheel, and producing an alternating current by a coil located in close proximity to the magnet.

11. A system that performs monitoring, comprising:

sensor means for performing wireless communication with a monitoring system; and, generator means for generating power for the sensor by scavenging power from fluid flow within a pipe, wherein the generator means comprises:

a generator that generates power for the sensor, the generator partially placed through a hole within a pipe so that part of the generator is on one side of the hole and outside the pipe and part of the generator is on another side of the hole and within the pipe so that a paddle wheel of the generator is rotated by fluid flow within the pipe, a magnet rotated with the paddle wheel, and a coil located in close proximity to the magnet that produces an alternating current signal when the magnet is rotated.

12. A system as in claim 11 wherein the magnet is attached to a shaft within the generator.

13. A system as in claim 11 wherein the magnet is located on a leg of the paddle wheel.

14. A system as in claim 11 wherein the magnet is implemented as a magnetized leg of the paddle wheel.

15. A system as in claim 11 wherein the sensor means is also for one of the following:

imaging a flame of an appliance;

detecting moisture;

measuring temperature;

measuring fluid flow within the pipe.

* * * * *